US008652706B2

(12) United States Patent
Song (10) Patent No.: US 8,652,706 B2
(45) Date of Patent: Feb. 18, 2014

(54) POLYMER ELECTROLYTE MEMBRANE FOR FUEL CELL AND FUEL CELL SYSTEM INCLUDING THE SAME

(75) Inventor: Min-Kyu Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1820 days.

(21) Appl. No.: 11/606,808

(22) Filed: Nov. 29, 2006

(65) Prior Publication Data

US 2007/0122676 A1    May 31, 2007

(30) Foreign Application Priority Data

Nov. 29, 2005  (KR) .................... 10-2005-0114830

(51) Int. Cl.
*H01M 8/10* (2006.01)

(52) U.S. Cl.
USPC ............ 429/492; 429/491; 429/493; 429/494

(58) Field of Classification Search
USPC ................................. 429/491–494
See application file for complete search history.

(56) References Cited

U.S. PATENT DOCUMENTS

| | | | |
|---|---|---|---|
| 3,953,566 A | 4/1976 | Gore | |
| 3,962,153 A | 6/1976 | Gore | |
| 4,330,654 A | 5/1982 | Ezzell et al. | |
| 4,358,545 A | 11/1982 | Ezzell et al. | |
| 4,417,969 A | 11/1983 | Ezzell et al. | |
| 4,433,082 A | 2/1984 | Grot | |
| 4,610,762 A | 9/1986 | Birdwell | |
| 4,940,525 A | 7/1990 | Ezzell et al. | |
| 5,094,995 A | 3/1992 | Butt et al. | |
| 5,547,551 A | 8/1996 | Bahar et al. | |
| 5,596,676 A | 1/1997 | Swaminathan et al. | |
| 5,599,614 A | 2/1997 | Bahar et al. | |
| 5,635,041 A | 6/1997 | Bahar et al. | |
| 6,042,958 A | 3/2000 | Denton et al. | |
| 6,130,175 A | 10/2000 | Rusch et al. | |
| 2004/0241522 A1* | 12/2004 | Ono et al. ................ | 429/34 |
| 2005/0112434 A1* | 5/2005 | Park et al. ................ | 429/30 |
| 2006/0035129 A1 | 2/2006 | Nomura et al. | |
| 2006/0180796 A1 | 8/2006 | Adachi et al. | |

FOREIGN PATENT DOCUMENTS

| | | |
|---|---|---|
| CN | 1581546 A | 2/2005 |
| CN | 1748265 A | 3/2006 |
| JP | 2000-90946 | 3/2000 |
| JP | 2004-079505 | 3/2004 |

(Continued)

OTHER PUBLICATIONS

J.-S. Hwang, Y.-T. Kim, S.-B. Park, M.-K. Song, H.-W. Rhee. Effect of PEGDA on the characteristics of blend membrane for Li cell and PEMFC, Mol. Cryst. Liq. Cryst. 2002, 377, 189-192.*

(Continued)

*Primary Examiner* — Carlos Barcena
(74) *Attorney, Agent, or Firm* — Christie, Parker & Hale, LLP (57) ABSTRACT

A polymer electrolyte membrane for a fuel cell includes a polymer matrix comprising a cross-linked curable oligomer with nano-sized proton conductive polymer particles in the polymer matrix. The curable oligomer may include unsaturated functional groups at each end of a chain, and may further include 3 to 14 ethylene oxides. The proton conductive polymer nano particles may include fluorine-based proton conductive polymer nano particles, non-fluorine-based proton conductive polymer nano particles, hydrocarbon-based proton conductive polymer nano particles, and combinations.

32 Claims, 4 Drawing Sheets

(56) References Cited

FOREIGN PATENT DOCUMENTS

| JP | 2005-32543 A | * | 2/2005 | .............. H01M 8/02 |
|---|---|---|---|---|
| KR | 2002-0096302 | | 12/2002 | |
| KR | 10-2005-0022744 | | 3/2005 | |
| KR | 10-2005-0070511 | | 7/2005 | |
| KR | 10-2005-0107491 | | 11/2005 | |
| WO | WO 96/06671 | | 3/1996 | |
| WO | WO 02/103834 A1 | | 12/2002 | |
| WO | WO 03/081691 A2 | | 10/2003 | |
| WO | WO 2005/101428 A1 | | 10/2005 | |

OTHER PUBLICATIONS

M. Tsige, T. R. Mattsson, G. S. Grest. Morphology of Evaporated Multiblock Copolymer Membranes Studied by Molecular Dynamics Simulations, Macromol. 2004, 37, 9132-9138.*

V.S. Silva, B. Ruffmann, S. Vetter, M. Boaventura, A.M. Mendes, L.M. Madeira, S.P. Nunes. Mass transport of direct methanol fuel cell species in sulfonated poly(ether ether ketone) membranes, Electrochimica Acta 2006, 51, 3699-3706.*

P. Staiti, A. S. Arico, V. Baglio, F. Lufrano, E. Passalacqua, V. Antonucci, Hybrid Nafion—silica membranes doped with heteropolyacids for application in direct methanol fuel cells, Solid State Ionics 2001, 45, 101-107.*

C. A. Cleveland, M. Hickner, J. E. McGrath. Effect of Solvent Composition and Concentration on Aggregate Size in Polymer Dispersions for Fuel Cell Membrane Electrode Assembly, SURP 2001.*

Patent Abstracts of Japan, Publication No. 2000-090946; Date of Publication: Mar. 31, 2000; in the name of Itaru Honma.

Korean Patent Abstracts, Publication No. 1020020096302 A; Date of Publication: Dec. 31, 2002; in the name of Min Kyu Song.

Korean Patent Abstracts, Publication No. 1020050022744 A; Date of Publication: Mar. 8, 2005; in the name of Hyuk Chang et al.

European Search Report dated Jul. 16, 2007, for EP 06124982.7, in the name of Samsung SDI Co., Ltd.

Korean Patent Abstracts, Publication No. 1020050070511 A, Published on Jul. 7, 2005, in the name of Rhee et al.

Japanese Office action dated Jun. 22, 2010, for corresponding Japanese Patent application 2006-320680.

English abstract and full English translation of Publication No. CN 1581546 A, 15 pages.

SIPO Certificate of Invention Patent No. 717630 issued on Dec. 22, 2010 for corresponding Chinese patent application No. 200610160642.3, with partial English translation 20 pages.

Japanese Office action dated Mar. 22, 2011, for corresponding Japanese Patent application 2006-320680.

European Office action dated May 18, 2012, for corresponding European Patent application 06124982.7, (6 pages).

* cited by examiner

POLYMER ELECTROLYTE MEMBRANE FOR FUEL CELL AND FUEL CELL SYSTEM INCLUDING THE SAME

CROSS-REFERENCE TO RELATED APPLICATION

This application claims priority to and the benefit of Korean Patent Application No. 10-2005-0114830 filed in the Korean Intellectual Property Office on Nov. 29, 2005, the entire contents of which are incorporated herein by reference.

BACKGROUND OF THE INVENTION

1. Field of the Invention

The present invention relates to a polymer electrolyte membrane for a fuel cell, and a fuel cell system including the same.

2. Description of the Related Art

A fuel cell is a power generation system for producing electrical energy through an electrochemical redox reaction of an oxidant and hydrogen in a hydrocarbon-based material such as methanol, ethanol, or natural gas. Such a fuel cell is a clean power source. It includes a stack composed of unit cells and can produce various ranges of power output. Since it has four to ten times higher energy density than a small lithium battery, it has become highlighted as a small portable power source.

Typical examples of fuel cells are polymer electrolyte membrane fuel cells (PEMFC) and direct oxidation fuel cells (DOFC). A direct oxidation fuel cell which uses methanol as a fuel is called a direct methanol fuel cell (DMFC).

A polymer electrolyte fuel cell provides advantages which include high energy density, but it also has problems in the need to carefully handle hydrogen gas, and the requirement of accessory facilities such as a fuel reforming processor for reforming methane, methanol, natural gas, or the like, in order to produce hydrogen as the fuel gas.

In contrast, a direct oxidation fuel cell has lower energy density than that of a polymer electrolyte fuel cell, but provides advantages which include easier fuel handling, the ability to operate at room temperature due to its low operation temperature, and the elimination of the need for additional fuel reforming processors.

In the above-mentioned fuel cell system, the stack that generates electricity substantially includes several unit cells stacked adjacent to one another. Each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to an anode and adsorbed on an anode catalyst where the fuel is oxidized to produce protons and electrons. The electrons are transferred into a cathode via an external circuit, and the protons are transferred into the cathode through the polymer electrolyte membrane. In addition, an oxidant is supplied to the cathode where it reacts with protons and electrons on a cathode catalyst to produce electricity along with water.

The polymer electrolyte membrane electrically insulates an anode and a cathode, transfers protons from the anode to the cathode during cell operation, and also separates gas and liquid reactants. Accordingly, a polymer electrolyte membrane should have excellent electrochemical stability, low ohmic loss at high current density, good separation properties between gas and liquid reactants during cell operation, and good mechanical properties and dimensional stability for stack fabrication.

As for the polymer electrolyte membrane, a perfluorinated sulfonic acid-based cation exchange resin (trade name: NAFION™) that E.I. du Pont de Nemours, Inc. developed in 1968 has been widely used. NAFION™ has hydrophobic polytetrafluoroethylene as a main chain and a functional group including a hydrophilic sulfone group at its side chain.

A NAFION™ polymer electrolyte membrane which is commercially available has many more advantages than a hydrocarbon-based polymer electrolyte membrane in terms of oxygen solubility, electrochemical stability, durability and the like. Since a NAFION™ polymer electrolyte membrane is proton-conductive when about 20% of the polymer weight therein becomes hydrated (i.e., a sulfone group included in a pendant group is hydrolyzed into sulfonic acid), a reaction gas used in a fuel cell should be saturated by water to hydrate the electrode membrane. However, the water gradually dries when operated at higher than the 100° C. boiling point of water, and accordingly the resistance of the polymer electrolyte membrane increases, deteriorating cell performance.

In addition, a NAFION™ polymer electrolyte membrane, which is commonly 50 to 175 μm thick, is prepared in a form of film by extrusion or solvent casting of a melted polymer. The NAFION™ polymer electrolyte membrane can be increased or decreased in thickness to improve dimensional stability and mechanical properties of a fuel cell. However, if it is increased in thickness, the conductivity of the polymer electrolyte membrane decreases, while if decreased in thickness, the mechanical properties are deteriorated.

In a methanol fuel cell, the polymer electrolyte membrane may allow liquid methanol fuel to pass through without reaction during the cell operation (referred to as methanol crossover), deteriorating cell performance as well as causing fuel loss, because the methanol is oxidized at the cathode.

A NAFION™ polymer electrolyte membrane also includes a hydrophobic area and a micro-phase hydrophilic cluster depending on temperature and a hydration degree. The hydrophobic area and micro-phase hydrophilic cluster repeatedly swell and shrink during operation and accordingly, induce membrane thickness and volume variation of about 15 to 20%. Therefore, in the case of a thin membrane, dimensional stability and interface properties between the electrode and electrolyte may be deteriorated.

SUMMARY OF THE INVENTION

One embodiment of the present invention provides a polymer electrolyte membrane having improved strength properties, good conductivity and improved economy.

Another embodiment of the present invention provides a polymer electrolyte membrane that can provide excellent fuel cell performance.

Yet another embodiment of the present invention provides a fuel cell system including an improved polymer electrolyte membrane.

According to an embodiment of the present invention, a polymer electrolyte membrane is provided that includes a polymer matrix including a cross-linked curable oligomer and a nano-sized proton conductive polymer particle in the polymer matrix.

According to yet another embodiment of the present invention, a fuel cell system is provided which includes an electricity generating element, a fuel supplier that supplies the electricity generating element with a fuel, and an oxidant supplier that supplies the electricity generating element with an oxidant. The electricity generating element includes a membrane-electrode assembly including an anode and a cathode separated by a polymer electrolyte membrane, and separators positioned at each side of the membrane-electrode assembly. The electricity generating element generates electricity through electrochemical reactions of the fuel and oxidant.

DETAILED DESCRIPTION

The present invention relates to a polymer electrolyte membrane for a fuel cell. Exemplary embodiments of the present invention will hereinafter be described in detail with reference to the accompanying drawings.

Figure 1:
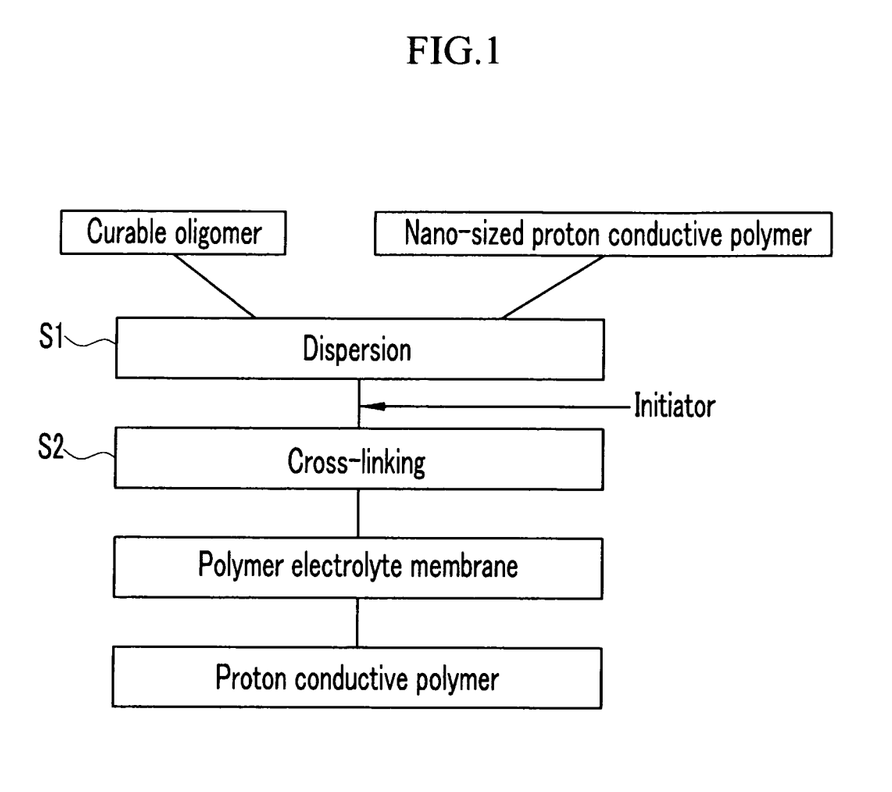
FIG. 1 is a schematic flowchart showing a process for fabricating a polymer electrolyte membrane according to one embodiment of the present invention.

With reference to FIG. 1, a polymer electrolyte may be prepared by uniformly mixing a curable oligomer which has a low molecular weight and is a liquid at room temperature, and a nano-sized proton conductive polymer to prepare a dispersion (S1). A reaction initiator is added to the dispersion, and the oligomer of the resulting mixture is cross-linked (S2) such as by exposing the dispersion to electronic beams or ultraviolet rays.

One embodiment of a process for manufacturing a polymer electrolyte membrane of the present invention will now be illustrated. However, components used in each step will be illustrated later, when the polymer electrolyte membrane is illustrated. But since an initiator is used in the manufacturing process but does not remain in a final polymer electrolyte membrane, it will be illustrated with the manufacturing process here.

According to an embodiment of the invention, first, a low molecular curable oligomer that is a liquid at room temperature, and a nano-sized proton conductive polymer are mixed to prepare a uniform dispersion (S1).

According to an embodiment, the curable oligomer and nano-sized proton conductive polymer are mixed in a weight ratio from 10:90 to 90:10. According to one embodiment, the weight mixing ratio may be from 30:70 to 70:30.

The proton conductive polymer may be in the form of a solid, or may be provided as a liquid including a solvent. Suitable solvents include alcohols such as methanol, isopropyl alcohol, ethanol, n-propylalcohol, and butanol, N-methyl-2-pyrrolidinone (NMP), dimethylformamide (DMF), dimethyl acetamide (DMA), tetrahydrofuran (THF), dimethyl sulfoxide (DMSO), acetone, methylethylketone (MEK), tetramethylurea, trimethylphosphate, butyrolactone, isophorone, carbitol acetate, methylisobutylketone, N-butyl acetate, cyclohexanone, diacetone alcohol, diisobutyl ketone, ethylacetoacetate, glycol ether, propylene carbonate, ethylene carbonate, dimethylcarbonate, diethyl carbonate, deionized water, and mixtures thereof. According to one embodiment, a mixture of water and 2-propanol may be used.

According to an embodiment, a reaction initiator is added to the dispersion, and then the dispersion is irradiated with electron beams or ultraviolet rays to induce a cross-linking reaction of the oligomer (S2) and prepare a polymer electrolyte.

Examples of the initiator include benzoyl peroxide, acetyl peroxide, dilauryl peroxide, potassium persulfate, an alkyl peroxide such as di-t-butylperoxide and chlorobenzophenone, cumene hydroperoxide, a perester such as t-butylperbenzoate, and an azo compound. The azo compound may be represented by RN=NR', wherein R and R' are $CH_3$, $(CH_3)_3C$, $C_6H_5(CH_3CH)$, $(C_6H_5)CH_2$, or $(CH_3)_2(CN)C$.

According to an embodiment, the reaction initiator is added to the dispersion in an amount from 0.1 to 5 parts by weight based on 100 parts by weight of curable oligomer. When the initiator is used in an amount of less than 0.1 parts by weight based on 100 parts by weight of the curable oligomer, less cross-linking occurs, whereas when it is more than 5 parts by weight, the initiator may inhibit cross-linking and remain as an impurity. According to an embodiment, the initiator initiates oligomer curing and then is removed by washing with sulfuric acid after a polymer electrolyte membrane has been manufactured and assembled with catalyst layers.

In an embodiment, the radiation of the electron beam or ultraviolet rays may be performed in a dry room or a clean room at room temperature. The radiation of the dispersion with may be performed by applying about 1 kV electron beams or ultraviolet rays for about 10 seconds.

In an embodiment, a polymer electrolyte membrane prepared as set forth above provides ion conductivity of an electrolyte matrix that approaches the ion conductivity of the proton conductive nano particles by physically contacting and percolating of the proton conductive nano particles that are added in an amount of about 50 wt %. Since the polymer electrolyte membrane can be prepared by the electron beam or ultraviolet ray radiation in a short amount of time, the polymer matrix constituting the polymer electrolyte membrane can be quickly formed on a surface of an electrode supporter. This can improve large-scale productivity of membrane-electrode assemblies for fuel cells. According to an embodiment, the polymer electrolyte membrane has a thickness from 30 to 80 μm.

The polymer electrolyte membrane according to an embodiment includes a polymer matrix including a cross-linked curable oligomer and the nano-sized proton conductive polymer in a polymer matrix.

According to an embodiment, the curable oligomer constituting the polymer matrix includes an unsaturated functional group at each chain terminal end of the oligomer. Examples of the oligomer include polyethyleneglycol diacrylate having 3 to 14 ethyleneoxide groups (—$CH_2CH_2O$—) represented by the following Chemical Formula 1.

$$CR_1R_2=CR_3COO(CH_2CH_2O)_pCOCH=CR_1R_2 \quad \text{Chemical Formula 1}$$

where each of $R_1$, $R_2$, and $R_3$ is independently hydrogen or a $C_1$ to $C_{1\text{-}2}$ alkyl chain, and p is an integer from 3 to 14.

According to an embodiment, the properties of a polymer electrolyte membrane may be regulated by selection of the curable oligomer. For example, when a polymer electrolyte membrane needs flexibility, an oligomer having more than nine ethyleneoxide groups (i.e., a molecular weight of more than 500) may be used. In contrast, when a polymer electrolyte membrane needs excellent strength, an oligomer having a low molecular weight may be used.

According to an embodiment, when the curable oligomer is uniformly mixed with proton conductive polymer nano particles it can form a net-structured polymer matrix through a cross-linking reaction, effectively improving dimensional stability of a polymer electrolyte membrane and also suppressing a reactant from passing through it.

According to an embodiment, the curable oligomer may be used in an amount from 10 to 90 wt % based on the entire weight of a polymer electrolyte membrane and depending on its desired properties. According to another embodiment of the present invention, it may be provided in an amount from 20 to 80 wt %, and according to still another embodiment, it may be used in an amount from 30 to 70 wt %. When the curable oligomer is included in an amount of less than 10 wt %, it may have a deteriorated cross-linking rate due to the dilution effect, thereby not forming a net structure. Accordingly, when prepared as a thin film, it may not maintain dimensional stability. When provided in an amount more than 90 wt %, the polymer electrolyte membrane may have deteriorated ion conductivity.

According to an embodiment, the polymer matrix includes a nano-sized proton conductive polymer. The proton conductive polymer may be a fluorine-based, non-fluorine-based, or hydrocarbon-based polymer.

According to an embodiment, the fluorine-based proton conductive polymer may be an ion exchange resin having a cation exchange group at its side chain, the cation exchange group selected from a sulfonic acid group, a carboxylic acid group, a phosphoric acid group, a phosphonic acid group, and derivatives thereof. In an embodiment, the ion exchange resin has an ion-exchange ratio ranging from 3 to 33. In the present specification, "ion exchange ratio of the ion exchange resin" is defined by the number of carbons in the polymer backbone and the number of cation exchange groups. This value corresponds to an equivalent weight (EW) of about 500 to 2000. The equivalent weight values are defined as the weight of an acidic polymer required to neutralize 1 equivalent of a base (NaOH). If the equivalent weight is excessively large, the resistance increases, whereas if it is excessively small, its mechanical property is deteriorated. Therefore, it needs to be controlled to maintain the desired properties.

In an embodiment, the hydrogen (H) in the proton conductive group of the fluorine-based proton conductive polymer can be substituted with Na, K, Li, Cs, or tetrabutylammonium. When the H in the proton conductive group of the terminal end of the proton conductive polymer side chain is substituted with Na or tetrabutylammonium, NaOH or tetrabutylammonium hydroxide may be used, respectively. When the H is substituted with K, Li, or Cs, suitable compounds for the substitutions may be used. Since such substitutions are known to this art, detailed description is omitted.

In an embodiment, the fluorine-based proton conductive polymer includes a perfluoro-based polymer or a fluoro ether-based polymer. Examples include poly(perfluorosulfonic acid) (NAFION™, E.I. du Pont de Nemours Company) of the following Chemical Formula 2, Aciplex (Asahi Kasei Chemical), Flemion (Asahi Glass) and Fumion (commercialized as Fumatech) fluorocarbon vinyl ether of the following Chemical Formula 3, and vinyl ether fluoride of the following Chemical Formula 4. The polymers disclosed in U.S. Pat. Nos. 4,330,654, 4,358,545, 4,417,969, 4,610,762, 4,433,082, 5,094,995, 5,596,676, and 4,940,525 can also be used and the disclosures of these patents in incorporated by reference.

Chemical Formula 2 where X is H, Li, Na, K, Cs, tetrabutyl ammonium, or $NR_1R_2R_3R_4$, where each of $R_1$, $R_2$, $R_3$ and $R_4$ is independently H, $CH_3$ or $C_2H_5$, m is greater than or equal to 1, n is greater than or equal to 2, x is from about 5 to about 13.5, and y is greater than or equal to 1000.

$$MSO_2CFRfCF_2O[CFYCF_2O]_nCF\!=\!CF_2 \qquad \text{Chemical Formula 3}$$

where Rf is fluorine or a $C_1$ to $C_{10}$ perfluoroalkyl radical, Y is fluorine or a trifluoromethyl radical, n is an integer from 1 to 3, M is selected from the group consisting of fluorine, a hydroxyl radical, an amino radical, and —OMe where Me is an alkali metal radical or a quaternary ammonium radical.

Chemical Formula 4 where k is 0 or 1, and l is an integer from 3 to 5.

In an embodiment, the sulfonic acid terminal groups of the above perfluorosulfonic acid (NAFION™) of Chemical Formula 2 are hydrated to form a micelle structure which provides a proton transfer path and behaves like a typical aqueous acid solution.

Examples of the non-fluorine-based proton conductive polymer include benzimidazole-based polymers, polyimide-based polymers, polyetherimide-based polymers, polyphenylenesulfide-based polymers, polysulfone-based polymers, polyethersulfone-based polymers, polyetherketone-based polymers, polyetheretherketone-based polymers, polyphenylquinoxaline-based polymers, polyether-based polymers, polyphenyleneoxide-based polymers, and polyphosphazene-based polymers. More specific examples of the non-fluorine-based proton conductive polymers include polybenzimidazole, polyimide, polysulfone, polysulfone derivatives, sulfonated-poly(ether ether ketone (s-PEEK)), polyphenyleneoxide, polyphenylenesulfide, polyphosphazene, and combinations thereof.

Examples of the hydrocarbon-based proton conductive polymers include a polystyrenesulfonic acid polymer grafted on polyethylene, a polypropylene polymer, a fluoroethylene polymer, and an ethylene/tetrafluoroethylene polymer.

Examples of the proton conductivity polymer include perfluoro-based polymers, polybenzimidazole-based polymers, and polysulfone-based polymers. According to one embodiment, poly(perfluorosulfonate) may be suitable.

According to an embodiment of the present invention, the proton conductive polymer can be used alone or in a mixture. It can be used in an amount from 10 to 90 wt % based on the entire weight of the polymer electrolyte membrane with the amount depending on the desired properties for the polymer electrolyte membrane. According to another embodiment of the present invention, the proton conductive polymer may be used in an amount from 20 to 80 wt %, and according to still another embodiment, it may be used in an amount from 30 to 70 wt %.

In a polymer electrolyte membrane according to an embodiment of the present invention, the proton conductive polymer nano particle may include a non-fluorine-based, hydrocarbon-based, or fluorine-based cation exchange resin particle in a solid state or dispersed in deionized water and an alcohol-based solvent. It may have a size from 10 to 200 nm. According to another embodiment, it may have a size from 10 to 100 nm.

When a fluorine-based cation exchange resin particle is provided in an extremely small amount, a polymer electrolyte membrane may have deteriorated ion conductivity. In contrast, when provided in an extremely large amount, it may have deteriorated mechanical strength and deteriorated separation performance of fuel gas (and/or liquid).

In addition, according to an embodiment, the particles may be formed from at least one of a polymer selected from the group consisting of a sulfonated polyimide-based, sulfonated polysulfone-based, poly(etherether ketone)-based (s-PEEK), poly benzimidazole-based (PBI) polymer, and the like.

Furthermore, according to an embodiment, a proton conductive polymer nano particle may include a block copolymer. The block copolymer can be produced by using a hydrophilic monomer as an S-block and a hydrophobic monomer as an F-block, copolymerizing them into a bi-block (S-F), or a tri-block (S-F-S or F-S-F) type block copolymer nano particle, and then sulfonating the copolymer. In an embodiment of a manufacturing process of the block copolymer, since an outside block has the same property, the copolymer may be curled into a loop like a chain when preparing a nano particle. The hydrophilic monomer may include polyethyleneoxide having a —$CH_2CH_2O$— unit and polystyrene sulfonic acid (PSSA) having a —$CH_2C(ph)H$— (where ph is a phenyl group) unit. The hydrophobic monomer may include polyvinylpyrrolidone having a —$CH_2C(C_5H_4N)H$— unit and polyacetoamine having a —COCRHNH— unit.

According to an embodiment of the present invention, a polymer electrolyte membrane may further include one or more additives such as an organic additive, an inorganic additive, or a combination of additives. In an embodiment, an additive is provided that is a minute powder-shaped hydrophilic inorganic ion conductor. Accordingly, when a polymer electrolyte membrane operates at a temperature of more than 100° C., the moisture therein may be evaporated, which can prevent proton conductivity from deteriorating.

In an embodiment, the additive is dispersed inside the polymer electrolyte membrane as a powder having a diameter from about 10 to 500 nm, and may thereby increase a movement site and/or a moisturizing site of a proton. In an embodiment, the additive may be included in an amount from 0.5 to 3 parts by weight based on 100 parts by weight of an entire polymer electrolyte membrane. When it is included in an amount of less than 0.5 parts by weight, it has little effect on the polymer electrolyte, while when more than 3 parts by weight are included, it may have deteriorated mechanical strength.

In an embodiment, the additive comprises an inorganic ion conductor that is a proton conductor. Examples include phosphotungstic acid, silicotungstic acid, zirconium hydrogen phosphate, $\alpha$-$Zr(O_{a1}PCH_{a2}OH)_a(O_{b1}PC_{b2}H_{b4}SO_{b5}H)_b \cdot nH_2O$, v-$Zr(PO_{a1}, H_{a2}PO_{a3})_a(HO_{b1}PC_{b2}H_{b3}SO_{b4}H)_b \cdot nH_2O$, $Zr(O_{a1}PC_{a2}H_{a3})_aY_b$, $Zr(O_{a1}PCH_{a2}OH)_aY_b \cdot nH_2O$, $\alpha$-$Zr(O_{a1}PC_{a2}H_{a3}SO_{a4}H)_a \cdot nH_2O$, $\alpha$-$Zr(O_{a1}POH) \cdot H_2O$, $(P_2O_5)_a(ZrO_2)_b$ glass, $P_2O_5$—$ZrO_2$—$SiO_2$ glass, and combinations thereof. In the above formulas, each of a1, a2, a3, a4, a, b1, b2, b3, b4, b5, and b is independently an integer ranging from 0 to 14, and n is an integer ranging from 0 to 50.

In another embodiment, the proton conductor may be supported on a supporter according to known processes in the related field. In an embodiment, the supporter can additionally improve mechanical properties of the proton conductor, which includes a cation exchange resin and an inorganic additive.

The supporter may include silica (fumed silica, trade name: Aerosil, Cabo-sil, and the like), clay, alumina, mica, or zeolite (trade name: SAPO-5, XSM-5, AlPO-5, VPI-5, MCM-41, and the like). Examples of clay include montmorillonite, saponite, hectorite, laponite, or tetrasilicic mica.

According to another embodiment of the present invention, a fuel cell system including the above polymer electrolyte membrane is provided. A fuel cell system of the present invention includes at least one electricity generating element, a fuel supplier, and an oxidant supplier.

According to an embodiment, each electricity generating element includes a membrane-electrode assembly with separators disposed at each side. It generates electricity through oxidation of a fuel and reduction of an oxidant.

According to an embodiment, each of the cathode and anode includes an electrode substrate and a catalyst layer.

The catalyst layer may include a platinum-based catalyst selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, and combinations thereof), and combinations thereof. According to an embodiment, an anode and a cathode can be formed of the same material. However, in another embodiment for a direct oxidation fuel cell, an anode may include a platinum-ruthenium alloy catalyst to prevent catalyst poisoning due to CO generated during the reaction. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or may be supported on a carrier. Examples of carriers include a carbon material such as acetylene black, denka black, activated carbon, ketjen black, and graphite, and inorganic particulates such as alumina, silica, zirconia, or titania. In an embodiment, carbon is generally used.

In an embodiment, the catalyst layer may be formed by mixing in appropriate ratios, a catalyst, a binder, and a solvent, and applying the mixture to an electrode substrate.

Examples of binders include a proton conductive polymer that can act as an ionomer. Examples of the proton conductive polymer include fluoro-based polymers such as perfluorosulfonate, polyamide-based polymers, polyether-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. The hydrogen (H) in the ion exchange group of the proton conductive polymer can be substituted with Na, K, Li, Cs, or tetrabutylammonium. When the H in the ion exchange group of the terminal end of the proton conductive polymer side is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used. Since such substitutions are known to this art, detailed description is omitted.

In an embodiment the binder resin may be used alone or as a mixture. Optionally, the binder resin may be used along with a non-conductive polymer to improve adherence between a polymer electrolyte membrane and the catalyst layer. The amount of binder resin used may be adjusted based on the desired properties for the polymer electrolyte membrane.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

Examples of the solvent include water, alcohols such as methanol, ethanol, or isopropylalcohol, N-methylpyrrolidone, dimethylacetamide, dimethylsulfoxide, tetrahydrofuran, acetone, and mixtures thereof.

The electrode substrates support the anode and cathode and provide a path for transferring the fuel and oxidant to catalyst layers. In one embodiment, the electrode substrates are formed from a material such as carbon paper, carbon cloth, carbon felt, or a metal cloth (a porous film composed of metal fiber or a metal film disposed on a surface of a cloth composed of polymer fibers). However, the electrode substrate is not limited thereto.

In an embodiment, the electrode substrates may be treated with a fluorine-based resin to be water-repellent and prevent deterioration of diffusion efficiency due to water generated during operation of a fuel cell. Examples of the fluorine-based resin include polyvinylidene fluoride, polytetrafluoroethylene, fluorinated ethylene propylene, polychlorotrifluoroethylene, a fluoroethylene polymer, and mixtures thereof.

In an embodiment, a microporous layer may be added between the electrode substrate and catalyst layer to increase reactant diffusion effects. The microporous layer generally includes conductive powders with a particular particle diameter. Examples of the conductive material include, but are not limited to, carbon powder, carbon black, acetylene black, activated carbon, carbon fiber, fullerene, nano-carbon, and combinations thereof. Examples of nano-carbon include carbon nanotubes, carbon nanofiber, carbon nanowire, carbon nanohorns, carbon nanorings, and combinations thereof. In an embodiment, the microporous layer is formed by coating a composition comprising a conductive powder, a binder resin, and a solvent on the electrode substrate. Examples of the binder resin include, but are not limited to, polytetrafluoroethylene, polyvinylidenefluoride, polyvinylalcohol, and celluloseacetate. Examples of the solvent include, but are not limited to, an alcohol such as ethanol, isopropyl alcohol, n-propyl alcohol, and butanol, water, dimethyl acetamide, dimethyl sulfoxide, and N-methylpyrrolidone.

The coating method may include, but is not limited to, screen printing, spray coating, doctor blade methods, gravure coating, dip coating, silk screening, and painting, the method used depending on the viscosity of the composition.

Figure 2:
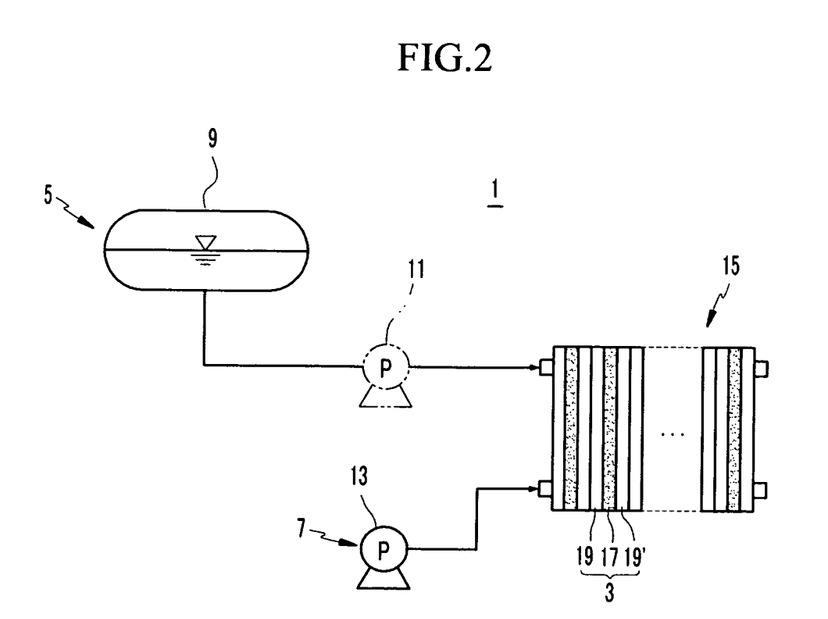
FIG. 2 is a schematic diagram showing the structure of a fuel cell system according to one embodiment of the present invention.

Referring to FIG. 2, a fuel cell system 1 according to an embodiment of the invention is described. According to FIG. 2, a fuel supplier 5, and an oxidant supplier 7 supply fuel and oxidant to a stack 15. The stack includes a plurality of electricity generating elements 3 that generate electrical energy through an electrochemical reaction of the fuel and the oxidant.

The fuel supplier 5 includes a tank 9, which stores fuel, and a fuel pump 11, which supplies the fuel to the stack 15. The oxidant supplier 7 includes a pump 13 for supplying the oxidant to the stack. The fuel may include liquid or gaseous hydrogen, or a hydrocarbon-based fuel such as methanol, ethanol, propanol, butanol, or natural gas. The oxidant may include oxygen or air. Though pumps 11 and 13 are illustrated, the present invention is not limited to such structures and the fuel cell system of the present invention includes other structures such as those where a fuel and an oxidant are provided to the stack by diffusion.

Each electricity generating element 3 includes a membrane-electrode assembly 17 that oxidizes hydrogen or a fuel and reduces an oxidant, separators 19 and 19' that are respectively positioned at opposite sides of the membrane-electrode assembly 17 and that supply a fuel, and an oxidant.

The following examples illustrate the present invention in more detail. However, it is understood that the present invention is not limited by these examples.

EXAMPLE 1

60 g of a commercially available 20 wt % NAFION™/$H_2O$ (E.I. duPont de Nemour Inc., EW=1100: in Chemical Formula 2, X=H, m=1, n=2, x=about 5 to 13.5, and y=greater than 1000) proton conductive polymer nano particle (100 nm) dispersion solution was mechanically agitated with 0.82 g of NaOH and 9 g of a polyethylene glycol diacrylate (Aldrich, MW=742, and p=14 in Chemical Formula 1) oligomer at room temperature for 6 hours. Then, 0.9 g of chlorobenzophenone was added to the agitated mixture and the mixture was agitated for another 5 minutes. The resulting product was coated on a glass plate and then exposed to 1 kV of ultraviolet rays to prepare a polymer electrolyte membrane.

Catalyst slurries were prepared by respectively mixing a 5 wt % NAFION™/$H_2O$/2-propanol solution, 1M of tetrabutylammonium hydroxide/methanol dipropylene glycol, and deionized water with Pt—Ru black (black, a catalyst not supported on a carrier, Johnson Matthey, HiSpec 6000) and Pt black (Johnson Matthey, HiSpec 1000) particles. The slurries were coated on either side of the polymer electrolyte membrane and then hot-pressed at 200° C. with a pressure of 500 psi for 3 minutes up to a load of 4 mg/$cm^2$, settling an anode and a cathode. NAFION™ was included in an amount of 15 wt % based on the catalyst weight in the catalyst layer. The 3-layer membrane electrode assembly was united with a 31BC electrode substrate (a diffusion layer) made by SGL Carbon Co. to prepare a 5-layer membrane-electrode assembly (MEA).

The prepared MEA was inserted between two glass fiber gaskets coated with polytetrafluoroethylene, and then between two separators having preformed gas and cooling channels, and was then compressed between copper end plates to fabricate a unit cell. After the unit cell was filled with methanol and nitrogen, it was measured for a methanol crossover current. In addition, after it was filled with methanol and ambient air, it was measured for power change depending on cell temperature and methanol concentration.

COMPARATIVE EXAMPLE 1

125 μm of a commercially available NAFION™ 115 membrane was treated with a 3% hydrogen peroxide solution at 100° C. and 0.5M of a sulfuric acid aqueous solution for 1 hour, and was then washed with deionized water at 100° C. to prepare a polymer electrolyte membrane.

COMPARATIVE EXAMPLE 2

A polymer electrolyte membrane was prepared by pretreating 25 μm of a commercially available Gore-Select membrane in the same method as in Comparative Example 1.

COMPARATIVE EXAMPLE 3

100 g of a commercially available 5 wt % NAFION™/H$_2$O/2-propanol (Solution Technology Inc., EW=1100) solution was agitated at room temperature for 48 hours while evaporating the solvent to prepare about 5 g of a NAFION™ gel. 95 g of dimethylacetamide was added to prepare about a 5 wt % NAFION™/dimethylacetamide solution. This solution was preheated in a 60° C. double boiler for 24 hours to evaporate the remaining moisture.

5 g of polyvinylidene fluoride (Elf Atochem America, Inc., Kynar Flex 761) was dissolved in 95 g of dimethylacetamide to prepare a 5 wt % polyvinylidene fluoride/dimethylacetamide solution. Then, 20 g of the polyvinylidene fluoride/dimethylacetamide solution was mixed with 50 g of the prepared 5 wt % NAFION™/dimethylacetamide solution.

Then, 1 g of polyethyleneglycoldiacrylate (Aldrich, MW=742) was added to the mixture solution and aggressively agitated at 50° C. for 10 minutes. Next, 0.03 g of a benzoyl peroxide was added to the mixture which was aggressively agitated for another 10 minutes. This resulting mixture was coated on the surface of polytetrafluoroethylene using a doctor blade method.

The prepared film was heated in an oven maintained at about 100° C. for 12 hours to fabricate a 30 μm-thick composite polymer electrolyte membrane.

Electrolyte membranes prepared according to Example 1 and Comparative Examples 1 to 3 were measured regarding ion conductivity through an impedance measurement depending on temperature, and relative humidity change by using a cell for measuring conductivity, which is made by BekkTech Co. The results are provided in Table 1.

In addition, the electrolyte membranes prepared according to Example 1 and Comparative Examples 1 to 3 were estimated for methanol permeability by measuring a refractive index change to evaluate the concentration of methanol permeated through when an electrolyte membrane specimen was positioned in the center of a 2-compartment diffusion cell, and then a 15 wt % methanol/deionized mixture solution and deionized water were respectively circulated at both ends. Furthermore, the electrolyte membranes were measured for an area change through an area increasing rate when the 5×5 cm$^2$ electrolyte membranes were swollen with moisture at room temperature. The results are provided in the following Table 1.

As shown in Table 1, a polymer electrolyte membrane of Example 1 had deteriorated ion conductivity but improved conductivity (S/cm$^2$) compared with a pure NAFION™ membrane of Comparative Example 1, because it was reinforced for mechanical strength and thereby could be fabricated to be thin. In addition, the polymer electrolyte membrane of Example 1 had much better dimensional stability and barrier properties against methanol than the pure NAFION™ membrane of Comparative Example 1. It also had equivalent unit cell power density to that of Comparative Example 1 when operated at 70° C. under the same conditions. Furthermore, the polymer electrolyte membrane of Example 1 can form an electrolyte matrix within several seconds by cross-linking an oligomer through exposure to ultraviolet rays, thereby providing improved productivity.

In addition, the polymer electrolyte membrane of Example 1 had equivalent dimensional stability to a reinforced composite membrane of Comparative Example 2 but lower methanol permeability than that of Comparative Example 2, which had excessive methanol permeability. It also had excellent unit cell power density when operated at 70° C.

Further, the polymer electrolyte membrane of Example 1 had much better dimensional stability and lower methanol permeability than that of Comparative Example 3, and also had excellent unit cell power density when operated at 70° C.

Figure 3A:
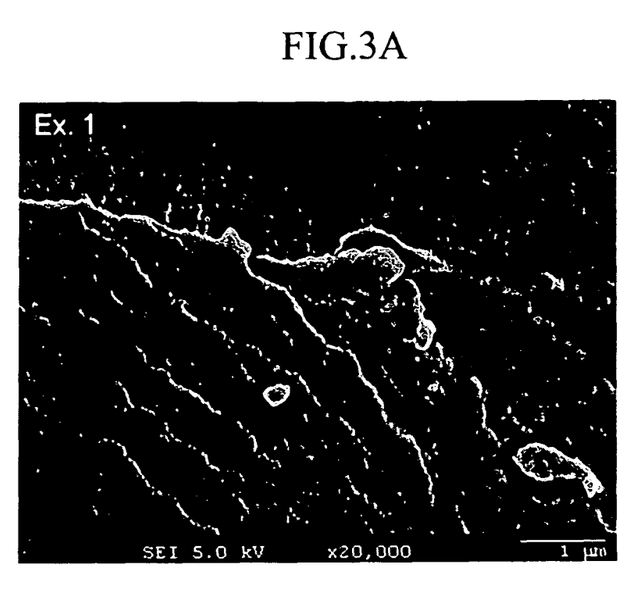
FIGS. 3A and 3B are SEM photographs showing the cross-sections of the polymer electrolyte membranes of Example 1 and Comparative Example 3, respectively.
Figure 3B:
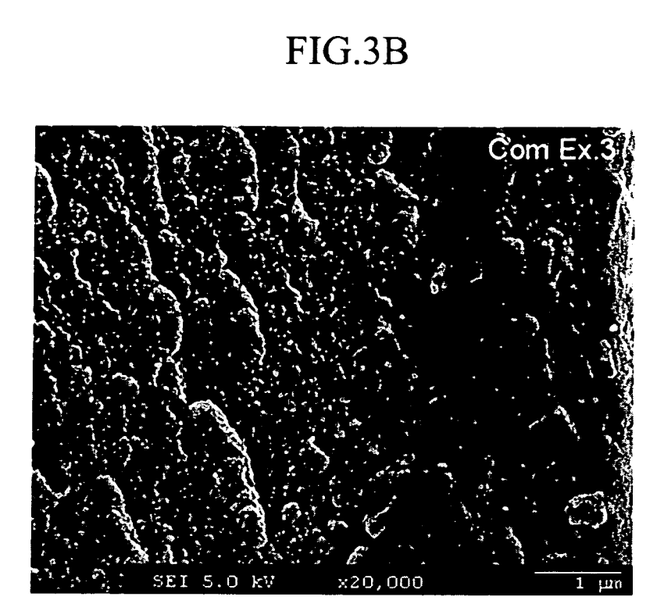

FIGS. 3A and 3B are SEM photographs showing the cross-sections of the polymer electrolyte membranes of Example 1 and Comparative Example 3, respectively. As shown in FIGS. 3A and 3B, the polymer electrolyte membrane according to Example 1 shows much more homogeneous cross-sectional morphology than Comparative Example 3 at the same NAFION™ content due to a smaller proton conductive particle size and narrower size distribution.

As described above, since a polymer electrolyte membrane for a fuel cell of the present invention can be quickly and easily manufactured, the present invention can provide a polymer electrolyte membrane with excellent productivity. Also, a polymer electrolyte membrane for a fuel cell of the present invention can be fabricated to be thin. Accordingly, the present invention can provide a polymer electrolyte membrane with excellent dimensional stability and hydrocarbon fuel barrier properties.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

TABLE 1

| | Thickness (μm) | Conductivity (S/cm) | Conductivity depending on a membrane thickness (S/cm$^2$) | Methanol permeability (cm$^2$/sec) | Volume expansion ratio (5M methanol) (%) | Power density 70° C. at 0.4 V (mW/cm$^2$) |
|---|---|---|---|---|---|---|
| Ex. 1 | 50 | 0.063 | 12.6 | $5.11 \times 10^{-7}$ | 15 | 115 |
| Comp. Ex. 1 | 125 | 0.082 | 6.56 | $2.03 \times 10^{-6}$ | 45 | 120 |
| Comp. Ex. 2 | 50 | 0.057 | 11.4 | $3.12 \times 10^{-5}$ | 14 | 85 |
| Comp. Ex. 3 | 50 | 0.041 | 8.2 | $7.21 \times 10^{-7}$ | 25 | 90 |

What is claimed is:

1. A polymer electrolyte membrane for a fuel cell comprising:

a polymer net structure consisting of a cross-linked curable oligomer;

and nano-sized proton conductive polymer particles;

wherein the proton conductive particles are dispersed in the polymer net structure.

2. The polymer electrolyte membrane of claim 1, wherein the curable oligomer has unsaturated functional groups at each end of a chain.

3. The polymer electrolyte membrane of claim 2, wherein the curable oligomer has 3 to 14 ethylene oxides in the following Chemical Formula 1:

$$CR_1R_2\!=\!CR_3COO(CH_2CH_2O)_pCOCH\!=\!CR_1R_2 \quad \text{Chemical Formula 1}$$

where each of $R_1$, $R_2$, and $R_3$ is independently selected from hydrogen and alkyl chains with from 1 to 12 carbons, and p is an integer from 3 to 14.

4. The polymer electrolyte membrane of claim 1, wherein the curable oligomer is provided in an amount from 10 to 90 wt % based on the total weight of the polymer electrolyte membrane.

5. The polymer electrolyte membrane of claim 4, wherein the curable oligomer is provided in an amount from 20 to 80 wt % based on the total weight of the polymer electrolyte membrane.

6. The polymer electrolyte membrane of claim 5, wherein the curable oligomer is provided in an amount from 30 to 70 wt % based on the total weight of the polymer electrolyte membrane.

7. The polymer electrolyte membrane of claim 1, wherein the proton conductive polymer particles comprise a polymer selected from the group consisting of fluorine-based proton conductive polymer nano particles, non-fluorine-based proton conductive polymer nano particles, hydrocarbon-based proton conductive polymer nano particles, and combinations thereof.

8. The polymer electrolyte membrane of claim 7, wherein the proton conductive polymer particles comprise fluorine-based proton conductive polymers with a cation exchange group at a side chain selected from the group consisting of a sulfonic acid group, a carboxylic acid group, a phosphoric acid group, a phosphonic acid group, and a derivative thereof.

9. The polymer electrolyte membrane of claim 7, wherein the proton conductive polymer particles comprise fluorine-based proton conductive polymer with an ion-exchange ratio from 3 to 33, and an equivalent weight from 500 to 2000.

10. The polymer electrolyte membrane of claim 1, wherein the proton conductive polymer is provided in an amount from 10 to 90 wt % based on the total weight of the polymer electrolyte membrane.

11. The polymer electrolyte membrane of claim 10, wherein the proton conductive polymer is provided in an amount from 20 to 80 wt % based on the total weight of the polymer electrolyte membrane.

12. The polymer electrolyte membrane of claim 11, wherein the proton conductive polymer is provided in an amount from 30 to 70 wt % based on the total weight of the polymer electrolyte membrane.

13. The polymer electrolyte membrane of claim 1, wherein the proton conductive polymer comprises a sulfonized bi- or tri-block copolymer comprising a hydrophilic monomer and a hydrophobic monomer.

14. The polymer electrolyte membrane of claim 1, wherein the polymer electrolyte membrane further comprises an additive.

15. The polymer electrolyte membrane of claim 14, wherein the additive comprises a hydrophilic inorganic ion conductor.

16. The polymer electrolyte membrane of claim 15, wherein the hydrophilic inorganic ion conductor comprises a material selected from the group consisting of phosphotungstic acid, silicotungstic acid, zirconium hydrogen phosphate, $\alpha\text{-}Zr(O_{a1}PCH_{a2}OH)_a(O_{b1}PC_{b2}H_{b4}SO_{b5}H)_b \cdot nH_2O$ where each of a1, a2, a, b1, b2, b4, b5, and b is independently an integer from 0 to 14 and n is an integer from 0 to 50, v-Zr $(PO_{a1}, H_{a2}PO_{a3})_a(HO_{b1}PC_{b2}H_{b3}SO_{b4}H)_b \cdot nH_2O$ where each of a1, a2, a3, a, b1, b2, b3, b4, and b is independently an integer from 0 to 14 and n is an integer from 0 to 50, $Zr(O_{a1}PC_{a2}H_{a3})_aY_b$ where each of a1, a2, a3, a, and b is independently an integer from 0 to 14, $Zr(O_{a1}PCH_{a2}OH)_a Y_b \cdot nH_2O$ wherein each of a1, a2, a, and b is independently an integer from 0 to 14 and n is an integer from 0 to 50, $\alpha\text{-}Zr(O_{a1}PC_{a2}H_{a3}SO_{a4}H)_a \cdot nH_2O$ where each of a1, a2, a3, a4, and a is independently an integer from 0 to 14 and n is an integer from 0 to 50, $\alpha\text{-}Zr(O_{a1}POH) \cdot H_2O$ where a1 is an integer from 0 to 14, $(P_2O_5)_a(ZrO_2)_b$ glass where each of a and b is independently an integer from 0 to 14, $P_2O_5\text{---}ZrO_2\text{---}SiO_2$ glass, and combinations thereof.

17. A fuel cell system comprising an electricity generating element, a fuel supplier adapted to supply the electricity generating element with a fuel, and an oxidant supplier adapted to supply the electricity generating element with an oxidant, wherein the electricity generating element comprises a membrane-electrode assembly and a pair of separators on opposite sides of the membrane-electrode assembly, the membrane-electrode assembly comprises a polymer electrolyte membrane and an anode and a cathode on opposite sides of the polymer electrolyte membrane, and the polymer electrolyte membrane comprises:

a polymer net structure consisting of a cross-linked curable oligomer, and a plurality of nano-sized proton conductive polymer particles;

wherein the proton conductive particles are dispersed in the polymer net structure.

18. The fuel cell system of claim 17, wherein the curable oligomer has unsaturated functional groups at both ends of a chain.

19. The fuel cell system of claim 18, wherein the curable oligomer has 3 to 14 ethylene oxides and is represented by Chemical Formula 1:

$$CR_1R_2\!=\!CR_3COO(CH_2CH_2O)pCOCH\!=\!CR_1R_2 \quad \text{Chemical Formula 1}$$

where each of $R_1$, $R_2$, and $R_3$ is independently selected from a hydrogen atom, and an alkyl chain having from 1 to 12 carbon atoms, and p is an integer from 3 to 14.

20. The fuel cell system of claim 19, wherein the curable oligomer is provided in an amount from 10 to 90 wt % based on the total weight of the polymer electrolyte membrane.

21. The fuel cell system of claim 20, wherein the curable oligomer is provided in an amount from 20 to 80 wt % based on the total weight of the polymer electrolyte membrane.

22. The fuel cell system of claim 21, wherein the curable oligomer is provided in an amount from 30 to 70 wt % based on the total weight of the polymer electrolyte membrane.

23. The fuel cell system of claim 19, wherein the proton conductive polymer comprises a polymer selected from the group consisting of a fluorine-based proton conductive polymer, a non-fluorine-based proton conductive polymer, a hydrocarbon-based proton conductive polymer, and combinations thereof.

24. The fuel cell system of claim 23, wherein the proton conductive polymer comprises a fluorine-based proton conductive polymer including a cation exchange group at a side chain selected from the group consisting of a sulfonic acid group, a carboxylic acid group, a phosphoric acid group, a phosphonic acid group, and a derivative thereof.

25. The fuel cell system of claim 24, wherein the fluorine-based proton conductive polymer has an ion-exchange ratio from 3 to 33 and an equivalent weight from 500 to 2000.

26. The fuel cell system of claim 17, wherein the proton conductive polymer is provided in an amount from 10 to 90 wt% based on the entire weight of the polymer electrolyte membrane.

27. The fuel cell system of claim 26, wherein the proton conductive polymer is provided in an amount from 20 to 80 wt% based on the entire weight of the polymer electrolyte membrane.

28. The fuel cell system of claim 27, wherein the proton conductive polymer is provided in an amount from 30 to 70 wt% based on the entire weight of the polymer electrolyte membrane.

29. The fuel cell system of claim 17, wherein the proton conductive polymer comprises a sulfonized bi- or tri-block copolymer comprising a hydrophilic monomer and a hydrophobic monomer.

30. The fuel cell system of claim 17, wherein the polymer electrolyte membrane further comprises an additive.

31. The fuel cell system of claim 30, wherein the additive comprises a hydrophilic inorganic ion conductor.

32. The fuel cell system of claim 31, wherein the inorganic ion conductor comprises a material selected from the group consisting of phosphotungstic acid, silicotungstic acid, zirconium hydrogen phosphate, $\alpha\text{-}Zr(O_{a1}PCH_{a2}OH)_a(O_{b1}PC_{b2}H_{b4}SO_{b5}H)_b \cdot nH_2O$ where each of a1, a2, a, b1, b2, b4, b5, and b is independently an integer from 0 to 14 and n is an integer from 0 to 50, $v\text{-}Zr(PO_{a1},H_{a2}PO_{a3})_a(HO_{b1}PC_{b2}H_{b3}SO_{b4}H)_b \cdot nH_2O$ where each of a1, a2, a3, a, b1, b2, b3, b4, and b is independently an integer from 0 to 14 and n is an integer from 0 to 50, $Zr(O_{a1}PC_{a2}H_{a3})_a Y_b$ where each of a1, a2, a3, a, and b is independently an integer from 0 to 14, $Zr(O_{a1}PCH_{a2}OH)_a Y_b \cdot nH_2O$ wherein each of a1, a2, a, and b is independently an integer from 0 to 14 and n is an integer from 0 to 50, $\alpha\text{-}Zr(O_{a1}PC_{a2}H_{a3}SO_{a4}H)_a \cdot nH_2O$ where each of a1, a2, a3, a4, and a is independently an integer from 0 to 14 and n is an integer from 0 to 50, $\alpha\text{-}Zr(O_{a1}POH) \cdot H_2O$ where a1 is an integer from 0 to 14, $(P_2O_5)_a(ZrO_2)_b$ glass where each of a and b is independently an integer from 0 to 14, $P_2O_5\text{—}ZrO_2\text{—}SiO_2$ glass, and combinations thereof.

* * * * *